United States Patent [19]

Botsolas et al.

[11] Patent Number: 5,049,590
[45] Date of Patent: Sep. 17, 1991

[54] POLY (VINYL CHLORIDE) INSULATION FITTINGS

[75] Inventors: Christos J. Botsolas, Clearwater; Terry C. Hayward, St. Petersburg, both of Fla.

[73] Assignee: Carol Botsolas, St. Petersburg, Fla.

[21] Appl. No.: 462,619

[22] Filed: Jan. 9, 1990

Related U.S. Application Data

[63] Continuation-in-part of Ser. No. 334,075, Apr. 5, 1989.

[51] Int. Cl.⁵ .......................... C08F 14/06; C08J 9/04
[52] U.S. Cl. .................................. 521/51; 428/36.5; 428/318.8; 521/73; 521/145
[58] Field of Search ................... 428/36.5, 36.9, 36.91, 428/318.6, 318.8; 521/51, 73, 145

[56] References Cited

U.S. PATENT DOCUMENTS

| | | | |
|---|---|---|---|
| 2,737,503 | 3/1956 | Sprague et al. | 521/145 |
| 3,764,642 | 10/1973 | Boutillier | 428/318.8 |
| 3,790,436 | 2/1974 | Graham, Jr. et al. | 428/318.8 |

Primary Examiner—William J. Van Balen
Attorney, Agent, or Firm—Hedman, Gibson, Costigan & Hoare

[57] ABSTRACT

A process in which a blowing agent dispersion medium is used for producing poly(vinyl chloride) that is particularly well suited for use in insulation covers and the insulation covers made from the resultant poly(vinyl chloride).

1 Claim, 1 Drawing Sheet

POLY (VINYL CHLORIDE) INSULATION FITTINGS

REFERENCE TO RELATED APPLICATIONS

This is a continuation-in-part of U.S. Ser. No. 07/334,075, filed Apr. 5, 1989, currently pending.

FIELD OF THE INVENTION

The invention relates to fittings used to cover pipe insulation. More particularly, the invention relates to fittings made of poly(vinyl chloride) adapted to provide enhanced stiffness to the fitting covers.

BACKGROUND OF THE INVENTION

Insulation has long been used to cover piping through which either hot or cold fluids flow.

Early efforts at insulating piping consisted of spreading cement in place on the exterior of the piping and pipe fitting and then adhering a fabric over the cement. Since then, insulation techniques have been developed that include various insulating materials, such as fiberglass covered with aluminum or plastic coverings. The aluminum and plastic covering are variously formed to take the shape of pipe lengths and pipe fittings.

The plastic coverings have generally been formed of commercial grade poly(vinyl chloride). Typically, the poly(vinyl chloride) used in coverings for pipe insulation has a specific gravity in the range of 1.44.

The poly(vinyl chloride) fittings have been formed into many shapes, some taking the shape of a Tee, an elbow or any other fitting to be covered. Others, such as described in U.S. Pat. No. 3,495,629 (Botsolas, Feb. 17, 1970) are designed with a first shape different from the fitting to be covered but with the capacity to be manipulated into a second shape in the form of the fitting to be covered.

SUMMARY OF THE INVENTION

It is an object of the present invention to provide a poly(vinyl chloride) fitting having a low specific gravity and stiffness characteristics greater than previously experienced by poly(vinyl chloride) insulation fitting covers.

It is another object of the invention to provide a process to produce poly(vinyl chloride) fitting covers having enhanced stiffness characteristics.

It is a further object of the present invention to produce fitting covers having stiff, hard exterior surfaces and foam-like interior with enhanced insulation characteristics.

It is still a further object of the present invention to provide poly(vinyl chloride) sheets that can be thermoform molded into large, relatively light weight fitting covers; i.e., above eighteen inches.

Thus, a process for producing poly(vinyl chloride) fitting and pipe covers has been created wherein the sheet poly(vinyl chloride) for the cover is produced with a blowing agent dispersion.

In essence, the blowing agent dispersion is preproduced in a pre-dispersion process in which the dispersion medium components are initially milled at temperatures in the 140° C. range and thereafter Barium Stearate and polyurethane elastomer are cut and folded into the dispersion. Finally, the blowing agent system is completed by adding azodicarbonamide and allowing the dispersion to cool to room temperature.

Thereafter, the blowing agent dispersion goes through a size reduction process and is added to a conventional poly(vinyl chloride) composition. Approximately one hundred parts of poly(vinyl chloride); two parts of dibutyl tin bis iso octyl thioglycolate; three parts acrylic processing aid and twelve parts impact modifier; twelve parts titanium dioxide; one and three quarters parts of Calcium Stearate; one and one-quarter parts parafin wax; one-half part oxidized polyethylene; and one and one-quarter part of the blowing agent dispersion are combined at high temperatures to provide the modified poly(vinyl chloride) for the fitting cover.

In a continuous process, the modified poly(vinyl chloride) is extruded at temperatures in the range of 365° F. and immediately subjected to sheet forming through a conventional three-roller assembly that has been cooled to approximately 70° F.

The sheets of modified poly(vinyl chloride) are then thermoform molded into the desired fitting cover shapes or cut to size to form pipe covers and produce fitting and pipe section covers having a specific gravity of less than 1.10 and enhanced stiffness.

DESCRIPTION OF THE DRAWING

The invention will be better understood when viewed with the following drawings wherein.

DESCRIPTION OF THE PREFERRED EMBODIMENT

The present invention has application with any insulation fitting cover and utility in environments wherein low specific gravity poly(vinyl chloride) having enhanced stiffness characteristics is desirable.

Thus, the invention will be described in detail in the formation of a poly(vinyl chloride) elbow fitting cover.

Figure 1:
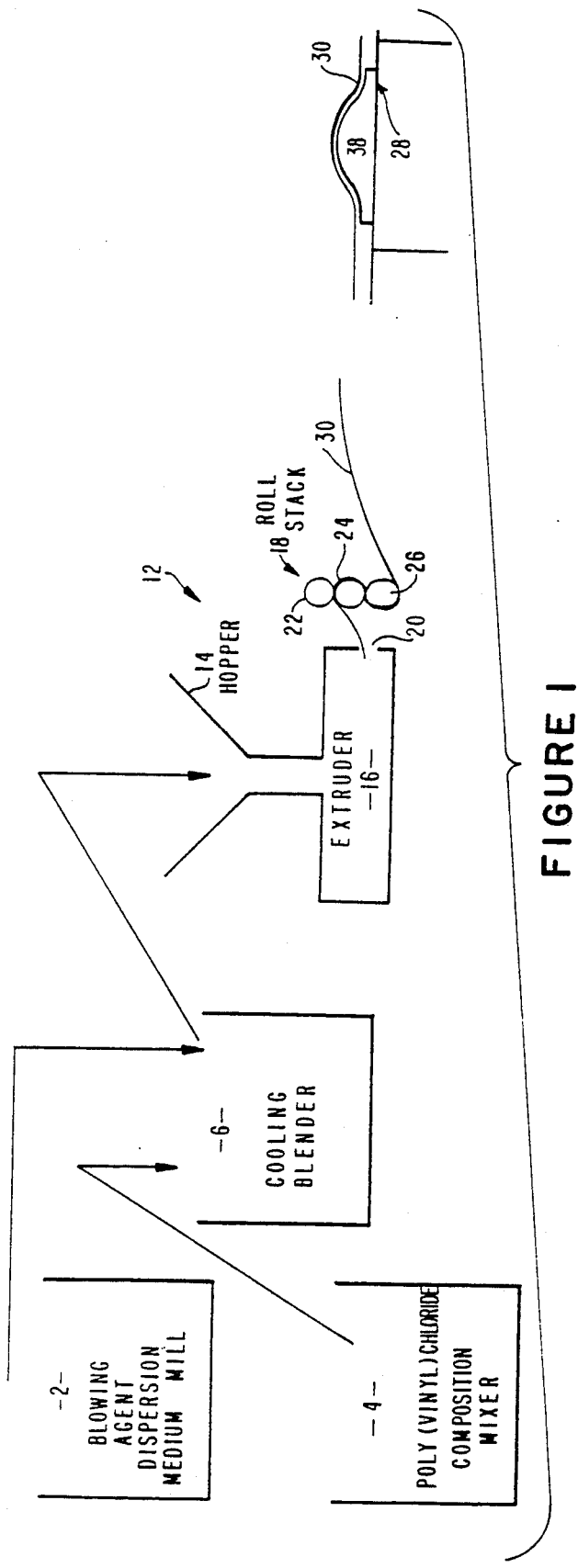
FIG. 1 is a process flow diagram illustrating a process of the present invention.
Figure 3:
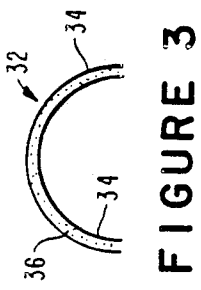
FIG. 3 is a cross-sectional view of the fitting cover or FIG. 2 taken through line 3—3 of FIG. 2.

As best seen in FIG. 1, a blowing agent dispersion medium is pre-formed as a pre-dispersed composition in mixing equipment shown schematically as mill 2.

In production, the pre-dispersion can be formed in any suitable, batch blending apparatus. However, it has been pre-dispersed in development by first milling, the dispersion medium additives at elevated temperatures such as 140° C. and, after fusion, cutting and folding Barium Stearate and thermoplastic urethane into the pre-dispersion with the final step being the addition of a blowing agent, in this case, azodicarbonamide. Upon completion of the formation of the blowing agent dispersion the poly(vinyl chloride) composition is formed using the blowing agent dispersion to provide a poly(vinyl chloride) with enhanced properties for use as insulation covers.

The poly(vinyl chloride) composition is again formed in any suitable mixing or blending apparatus. Practice has shown that a high intensity mixer such as a Henschel mixer 4 is well suited for the application.

Poly(vinyl chloride) resin and dibutyl tin bis iso octyl thioglycolate are first charged to the mixer 4 and heated to a temperature in the range of 165° F. Next, an impact modifier is added to the dispersion in the mixer 4 and the temperature further elevated. e.g. to about 185° F. Thereafter, calcium stearate and parafin wax are added to the dispersion in the mixer 4 and the temperature again increased, e.g. to about 200° F.

The dispersion is then dropped into a cooling blender 6 and the blowing agent dispersion initially produced is added to form the final poly(vinyl chloride) dispersion which is cooled in the cooling blender to about 120° F. The dispersion can also be metered into the PVC mix in the feed hopper above the extruder.

The final poly(vinyl chloride) dispersion is formed into sheets in the sheet forming assembly 12 seen in FIG. 1, which is comprised of a hopper 14, extrusion assembly 16 and a three roll stack 18.

The extruder assembly 16 is arranged with the extruded die opening 20 in close adjacent relationship to the roll stack 18, e.g., one and one-half inches apart. Practice has shown that a Cincinnati Millicron extruder CM-80 with high performance screws feeding a fifty-two inch die 20 can be used in this application.

The extruder assembly 16 is set with the barrel, screw oil and die at elevated temperatures. Illustratively, the barrel temperature is set between 335° F. and 365° F., the screw oil temperature is set in the range of 340° F. and the die temperature in the range of 320° F.

All three rollers 22, 24 and 26 of the roll stack 18 are set for low temperature, i.e. a temperature below 75° F. and preferably 70° F.

The process proceeds by charging the final poly(vinyl chloride) dispersion from the cooling blender, into the hopper 14, extruding the poly(vinyl chloride) material through the extruder 16 heated as previously described and out the die 20 set for a fifty-two inch discharge and thereafter rolled into fifty-two inch sheets by the cooled roll stand 18.

The formed sheet 30 is approximately 90 mils thick and comprised of poly(vinyl chloride) having a specific gravity of less than 1.10 and a stiffness conforming to the ASTM D-790 stiffness standard. The product formed provided a hard shell 34 and a foam 36 on the inside, thus resulting in a stiffer, lighter material with better insulating properties than the poly(vinyl chloride) fitting and pipe covers previously used. In one embodiment which is the current preferred embodiment the specific gravity is between 1.10 and 1.05. Further reduction of specific gravity is achieved by the addition of more blowing agent dispersion in the Poly(vinyl chloride) to achieve specific gravities as low as 0.60, with the lowest practical limit being approximately 0.30 specific gravity.

Figure 2:
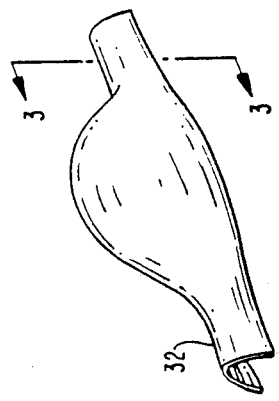
FIG. 2 is an illustration of one fitting cover of the present invention.

The sheet 30 is then formed into various pipe insulation covers such as the elbow cover 32 shown in FIG. 2 by conventional thermoform molding. Illustratively, a table 28 is shown in FIG. 1 with a mold 38 over which the sheet 30 is vacuum formed to produce the elbow cover 32.

An illustrative example of the process, procedure and resulting product of the present invention proceeds as follows:

The following materials are used with the respective parts to provide the blowing agent dispersion:

| Ingredients | Respective Parts |
| --- | --- |
| poly(vinyl chloride) | 100.00 |
| dibutyl tin bis iso octyl thioglycolate | 2.00 |
| Butyl Benzl Phthalate | 25.00 |
| urethane elastomer | 43.00 |
| azodicarbonamide | 35.00 |
| Barium Stearate | 17.50 |
| parafin wax | 1.25 |

| Ingredients | Respective Parts |
| --- | --- |
| calcium stearate | 1.75 |
| calcium carbonate | 35.00 |

First the poly(vinyl chloride), dibutyl tin bis iso octyl thioglycolate, butyl benzl phthalate, parafin wax, calcium stearate and calcium carbonate are cut and folded for three minutes in a mill at 140° C. Thereafter, the Barium Stearate and Urethane elastomer are added and cut and folded into the dispersion for one and one-half minutes. Finally, the azodicarbonamide (which is yellow) is added to the dispersion and mixed until a uniform color results. The dispersion is allowed to cool to room temperature and solidify. The solid is then ground to a suitable particle size for use as the system blowing agent dispersion medium.

Thereafter, the poly(vinyl chloride) composition which is ultimately charged to the hopper 14 is prepared from the following formulation:

| Ingredients | Respective Parts |
| --- | --- |
| poly(vinyl chloride) | 100.00 |
| dibutyl tin bis iso octyl thioglycolate | 2.00 |
| acrylic impact modifier | 12.00 |
| acrylic processing aid | 3.00 |
| titanium dioxide | 12.00 |
| calcium stearate | 1.75 |
| parafin wax | 1.25 |
| oxidized polyethylene | 0.50 |
| blowing agent dispersion (from above process) | 1.25 |

The poly(vinyl chloride) and dibutyl tin bis iso octyl thioglycolate are charged in a Henschel mixer and elevated in temperature to 165° F. The impact modifier is added to the mixer and the composite dispersion is raised in temperature to 185° F. The calcium stearate and parafin wax are added to the mixer and the composite dispersion is raised in temperature to 200° F. Next, the titanium dioxide and acrylic processing aid are added to the mixer and the temperature is raised to 220° F. The composition is next dropped into a cooling blender wherein the blowing agent dispersion medium is added. The dispersion is cooled to 120° F. while the blowing agent dispersion medium is mixed into the dispersion, resulting in a powder at 120° F.

The resulting powder is charged to the hopper 14 and extruded through the extruder at conditions wherein the extruder barrel temperature is 335° F. to 365° F., the screw oil temperature is 340° F., the die temperature is 320° F. and the material feed and screw speed are set for 60–70 amps.

The extruder material leaving the die 20 is immediately rolled (by rollers set at 70° F.) into poly(vinyl chloride) sheets 90 mils thick and 51 inches wide. The resulting sheets were vacuum formed into insulation pipe fitting covers such as seen in FIG. 2.

Although various suppliers' materials can be used, the example was conducted with GEON 85 poly(vinyl chloride) (B. F. Goodrich Co.); CC-11 Cardinal Chemical Co. dibutyl tin bis iso octyl thioglycolate; K120N Rohm & Haas acrylic processing aid; D-200 M&T impact modifier; C-Wax Cardinal Chemical Co. 165° F. parafin wax; AC 629A Allied Chemical oxidized polyethylene; Monsanto BBP butyl benzl phthalate; TPU 455 Morton Thiokol urethane elastomer; AZRV Uniroyal azodicarbonamide; and UFT Omya Corp. calcium carbonate. Generic calcium stearate, barium stearate and titanium dioxide were used.

As used herein "pipe insulation cover" means insulation covers for both pipe lengths and the various fittings that connect the pipe lengths such as elbows, Tees, etc. As used herein "blowing agent dispersion" means the blowing agent ingredient prepared as a pre-dispersion to be added to the poly(vinyl chloride) composition ultimately used in the manufacture of the pipe insulation cover.

We claim:

1. A poly(vinyl chloride) composition comprised of:

| Ingredients | Respective Parts |
| --- | --- |
| poly(vinyl chloride) | 100.00 |
| dibutyl tin bis iso octyl thioglycolate | 2.00 |
| acrylic processing aid | 3.00 |
| acrylic impact modifier | 12.00 |
| titanium dioxide | 12.00 |
| calcium stearate | 1.75 |
| parafin wax | 1.25 |
| oxidized polyethylene | 0.50 |
| blowing agent dispersion | 1.25 | wherein the blowing agent dispersion formulation is:

| Ingredients | Respective Parts |
| --- | --- |
| poly(vinyl chloride) | 100.00 |
| dibutyl tin bis iso octyl thioglycolate | 2.00 |
| butyl benzl phthalate | 25.00 |
| urethane elastomer | 43.00 |
| azodicarbonamide | 35.00 |
| Barium Stearate | 17.50 |
| parafin wax | 1.25 |
| calcium stearate | 1.75 |
| calcium carbonate | 35.00 |

* * * * *